W. AND W. R. CHADBURN.
MOTION TRANSMISSION SYSTEM.
APPLICATION FILED APR. 10, 1918.

1,390,092.

Patented Sept. 6, 1921.
4 SHEETS—SHEET 1.

Inventors.
W. Chadburn
W. R. Chadburn by Jno. Imirie
Attorney.

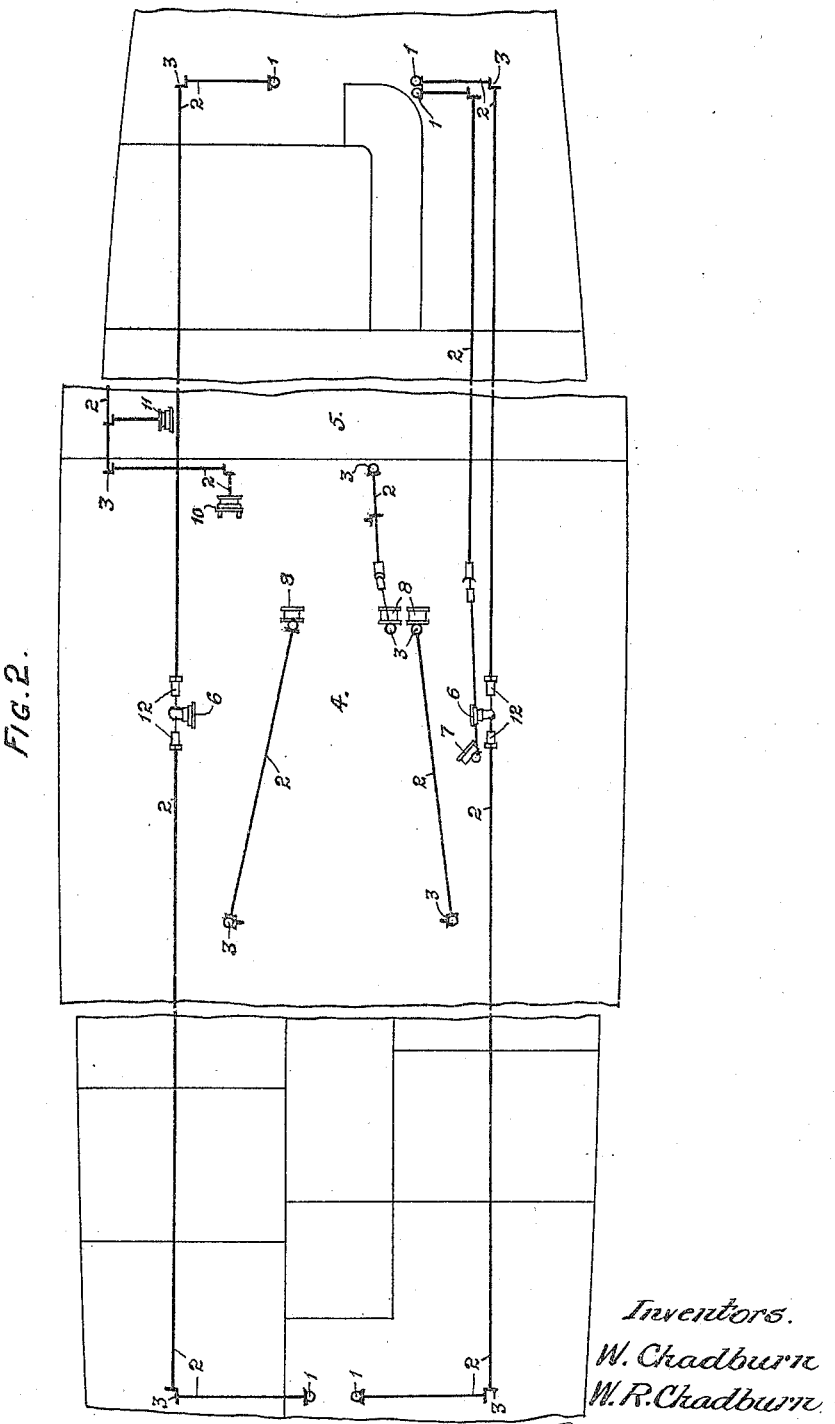

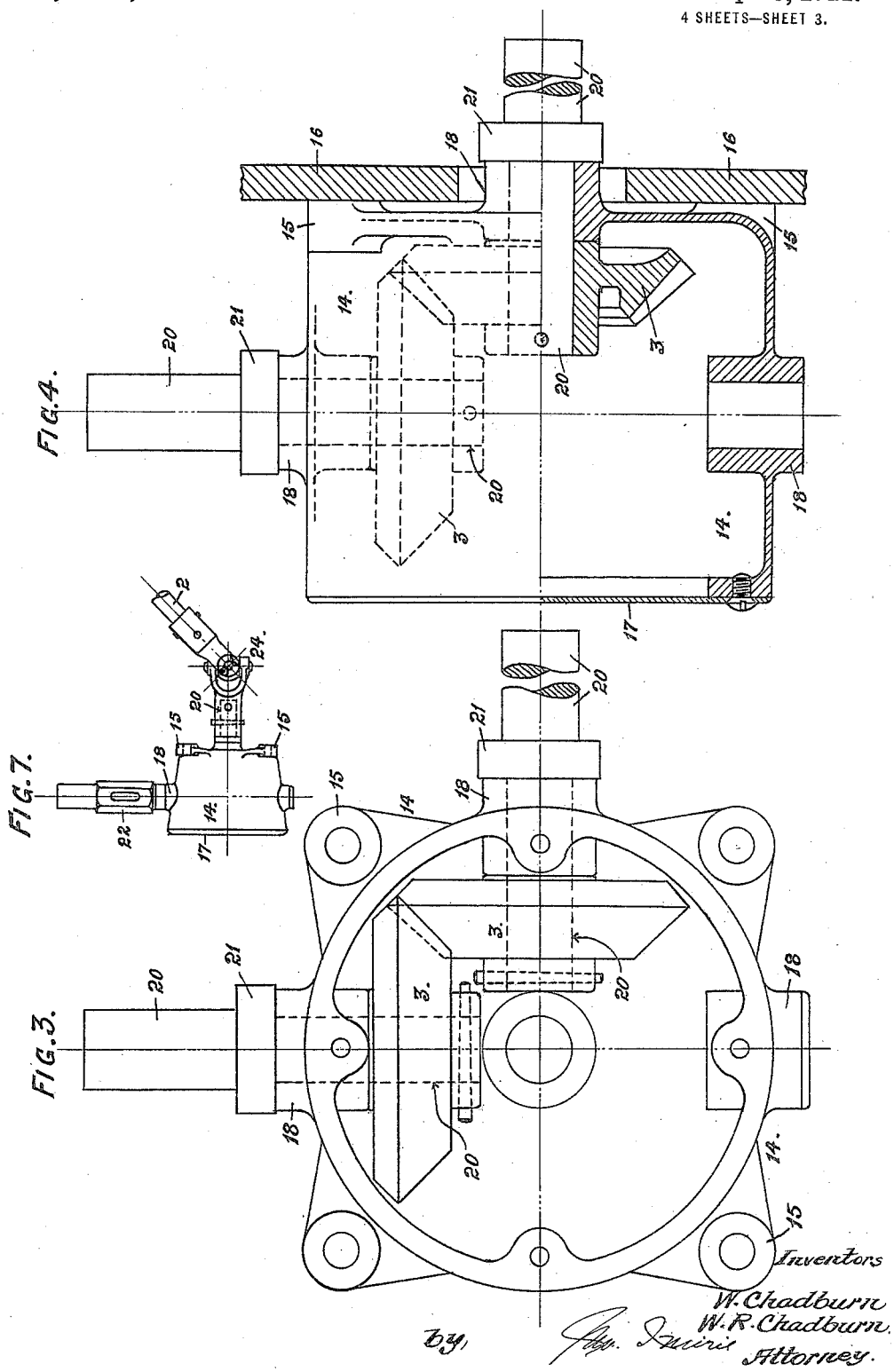

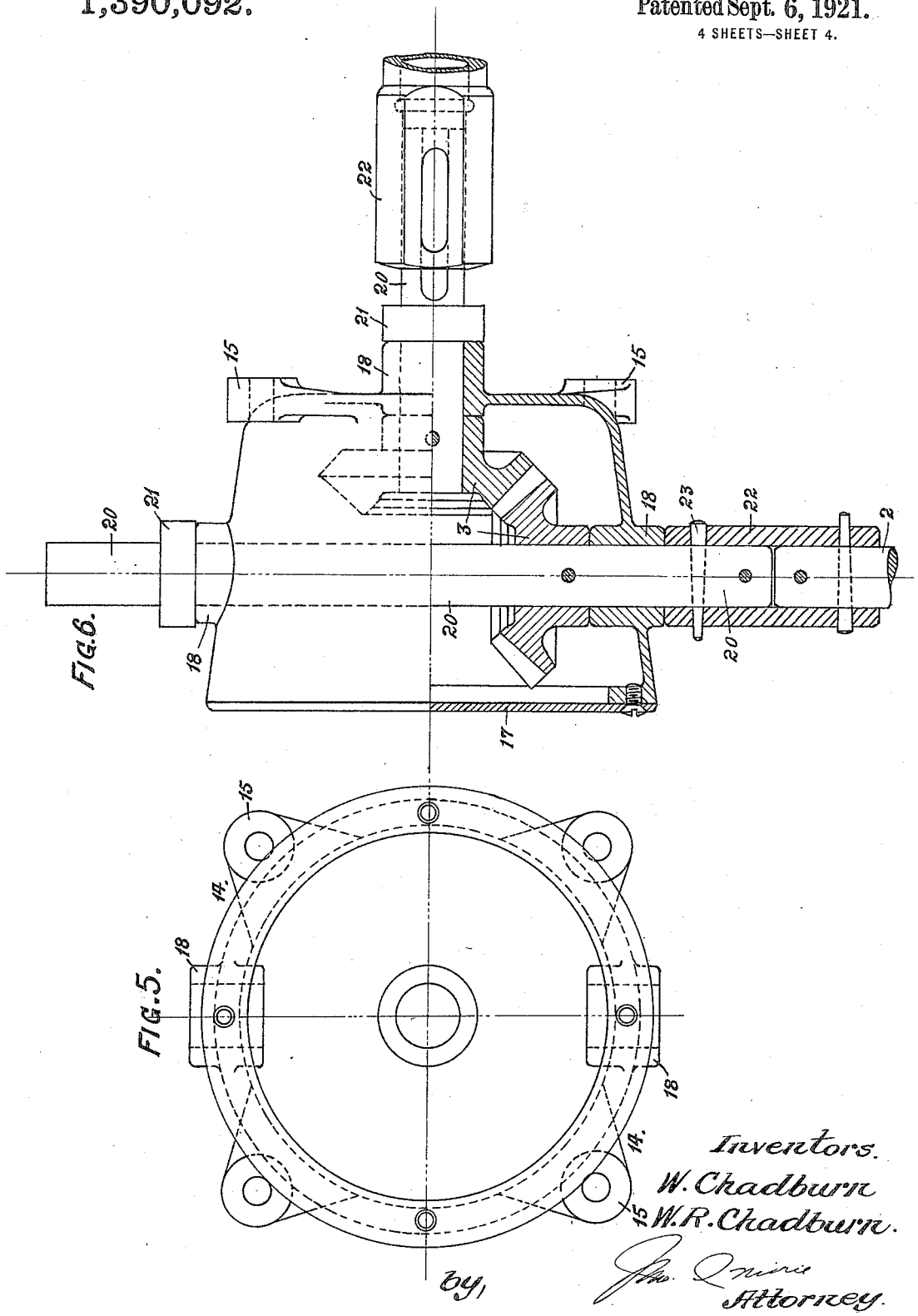

UNITED STATES PATENT OFFICE.

WILLIAM CHADBURN, OF BOURNEMOUTH, AND WILLIAM ROY CHADBURN, OF BIRKDALE, ENGLAND.

MOTION-TRANSMISSION SYSTEM.

1,390,092. Specification of Letters Patent. Patented Sept. 6, 1921.

Application filed April 10, 1918. Serial No. 227,742.

*To all whom it may concern:*

Be it known that we, WILLIAM CHADBURN and WILLIAM ROY CHADBURN, subjects of the King of England, residing at Bournemouth, in the county of Hampshire, England, and Birkdale, Southport, in the county of Lancaster, England, respectively, have invented new and useful Improvements in or Connected with Motion - Transmission Systems, of which the following is a specification.

This invention has reference to rotary rod motion transmission control systems for actuating instruments or mechanisms at one station or place at a distance from the station or place of a hand actuated or machine actuated mechanism or instrument; examples of which are rod or shaft control systems of ships and like telegraphic, or signaling or indicating apparatus of various kinds, steering apparatus, docking apparatus, and other analogous apparatus, i. e. where motion has to be transmitted through a rod or shaft control system from an operating or transmitting instrument at one station or place on a vessel to an indicating, signaling, or other instrument or mechanism at a distance therefrom, at another station or place of the ship.

Systems of this kind as applied to ships, in carrying them out or applying them, are, in most cases, complex, and at the same time costly, due in part to the varied directions in which, between the hand operated instrument or mechanism and the apparatus or the machine at a distance it has to operate, the rod or shafting has to take, and the various bends and angles at the places of change of direction, at which the motion is transmitted through tooth bevel wheel gearing, and to the difficulties in ships, in fitting or erecting such systems, in respect of true alinement, fitting of the different lengths and gears, etc. Installing such systems, is in itself difficult, and takes much time; and generally parts have to be temporarily erected, tried, and fitted, and then taken down, and either sent to a permanent or temporary workshop, to have various operations such as forming key-ways, holes, etc., made, lengths cut, and so on, as determined by the temporary erection and fitting, for the proper final and permanent working condition of the apparatus, so that it shall work by hand without strain and with little friction, in spite of the multiplicity of bends or directions and lengths of rods or shafting, sets of gearings, etc. The time entailed, moreover, has very frequently been very large, which in itself is disadvantageous (irrespectively of expense due to the consumption of time), in that it may cause delay in the completion of the whole ship or structure to which the system is applied, and of which it forms a very important, although may be small part of the equipment of the ship or structure.

The invention has for its object to provide a system or systematic method of constructing a rod manipulation control apparatus of this kind, by which much of the excessive time and expense, due to causes stated, can be avoided, and the system can be fitted and installed in a ship, at a relatively low cost, and without the necessity of employing special technical workmen skilled in this line of engineering, which hitherto has been required, so rendering this system of rod control or actuation more generally applicable to ships, where such specially skilled mechanics are not available (which they are not in many places), and thereby rendering this better system of control or actuation applicable to cases where the much less efficient and unsatisfactory systems, such as the longitudinally movable chain or wire or like motion transmission means, have hitherto been employed.

The invention consists of the system or systematic method of construction of apparatus of the kind referred to, as hereinafter specified, by which the above objects are attained.

By this system, the putting together or installing of apparatus of this kind, is more an act of assembling the parts, than fitting, in the sense applied in fitting or installing apparatus of this kind, as hitherto has been found necessary.

It is known in apparatus of this kind that it is of the greatest importance that there should be no lost motion or backlash of any kind or degree, between the hand operated instrument or mechanism, at the one end, and the part moved at the other; and there should be in this latter part practically absolute obedience of action to that set up in and by the hand operated instrument or gear.

In the drawings:

Fig. 2 is a plan of the same.

Fig. 3 is a plan of the improved direction change unit used in the system.

Fig. 4 is a vertical section partly in elevation of the same.

Fig. 5 is an elevation of the casing for such unit.

Fig. 6 is a view in elevation, partly in section, showing the unit applied to a continuous shaft.

Fig. 7 is a plan view showing the unit in position for use with a non-alined shaft.

Figure 1:
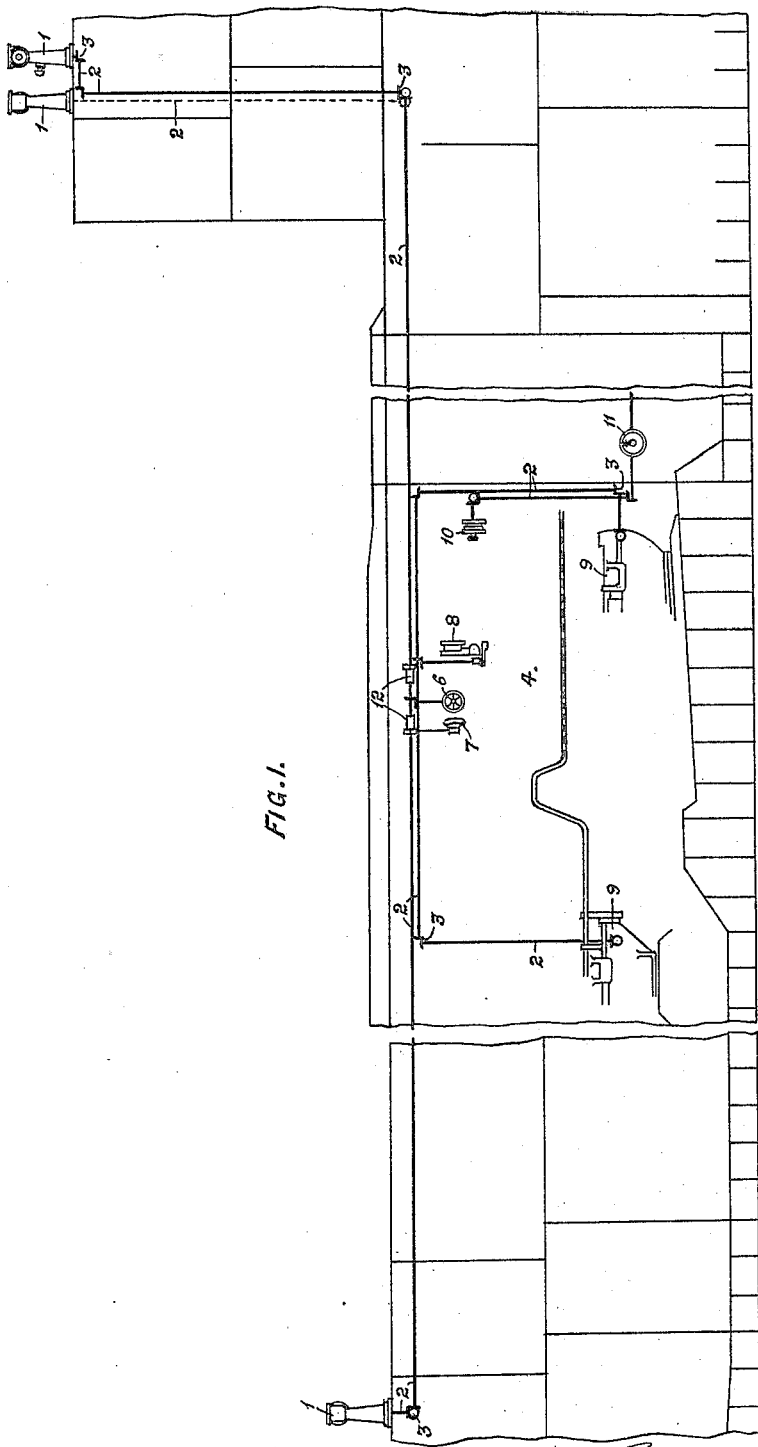
Figure 1 is a longitudinal section illustrating diagrammatically the improved system.

The installation shown includes telegraphic apparatus for the engine room, telegraphic apparatus between the engine room and the boiler room, and engine speed telegraphic or indicating apparatus; and the diagram is employed to illustrate the repeated applications of the invention to such a ship, and indicates how its application accomplishes its primary purposes, namely, the saving of time and expense.

In the illustration—Figs. 1 and 2—transmitting instruments are marked 1, and in the case shown there are three on one side of the ship, and two on the other; four of which are for operating the "word-order" or like telegraph, and the other say a "revolution" or numeral order telegraph. The rotary motion transmission rods are marked 2, and the bevel gear wheels by which motion is transmitted from one portion of the shaft to another at right angles (or other special angle) are designated 3.

The engine room is marked 4, and the boiler room 5.

Regarding the engine room, in it 6 represents the ordinary engine room receiver for giving "word" orders, that is for comveying "word" orders from any of the word order transmitting instruments, of which there are two on the fore part of the ship, and two on the aft part. 7 is a receiving instrument for indicating orders in the form of "revolutions," i. e. the number of revolutions that have to be made by the engines in a given time; and this instrument is connected with the left hand forward transmitting instrument 1, its motion transmission shafting 2 in the plan in Fig. 2 being shown on the inside of the shafting 2 of the "order" telegraphic motion transmission rods. 8 are speed indicating instruments of which there are three, and they are worked by the shafting 2 and bevel gears 3 from the engines 9, which represent parts of the ship's turbine propelling engines, there being one instrument 8 for each engine.

10 is a transmitting instrument in the engine room of a boiler room ship's telegraph, for conveying orders or notifications to the boiler room; and 11 shows a receiving instrument in the boiler room 5, of which there may be several.

In apparatus of this kind, it is required in some cases that where a single instrument has to be operated from different transmitters at different points of the ship, that rod or shaft disconnecting and connecting couplings are necessary on the shafts operated by these instruments; and in Figs. 1 and 2 these are marked 12. By these means either transmitting instrument and its shafting can be thrown out of operation or gear with the common receiver, while the other is in gear.

The diagram in Figs. 1 and 2 illustrates the multiplicity of sets of "turns" or changes of direction of the motion rods or shafting 2, and the number of the rods or shafts, and sets of bevel gears 3 which have to be employed in many ships, all of which sets of rods or shafts have to be truly alined and set at the right angle in order that the gears at the turns will work smoothly, with little friction and power, and at the same time without any backlash or material loss of motion; and this fitting is rendered ordinarily more difficult and lengthy by reason of the form and shape of ships, and their decks, bulkheads, plating, etc., which mostly do not lie at right angles to one another, nor are they in many parts rectilinear.

In carrying out the system or systematic method of construction of rod manipulation control apparatus of the kind herein referred to, according to this invention, at the various bends or places of change of direction or run of the rods or shafts, self-contained fitted gear units are employed, such units consisting of bevel gear wheels 3, contained and combined in boxes or cases 14, as shown in Figs. 3 to 7, and formed with lugs 15 or flanges or the like, for fastening them to a surface—say bulk heads 16—at the back (or side) and at the front are fitted with an easily removable cover 17; and the bevel wheels 3 inside the boxes are fixed on stump shafts 20—i. e. short pieces of shaft—having a collar 21 formed on same, which come against the outside end of the bearing bosses 18; and the bevel wheels 3 are fixed on the ends of the stump shafts 20 inside the box, the bosses of the wheels 3 being placed up against the inside edges of the bearing bosses 18. The body walls of the boxes or cases 14 are provided with a plurality of the bored bearing bosses 18, so placed that the different wheel stump shafts 20 can be inserted through them, and carried out at right angles in different directions (or other angles), and also in some cases in a straight line, from either side, or at the back.

The wheels and stump shafts are permanently fitted and fixed in place in the closed box; and this will be done at their place of manufacture; and the whole will constitute a ready made self-contained standard direction gear unit, adapted to be serviceable for different directions which the shafting or rods may be desired to take, at will, and at practically all places where such changes of directions are required.

Usually the length of stump shaft extending out beyond the collar next a gear box bearing boss, will be from 1½ to 2½″.

These gear units will be fixed, at all places where change of direction of rod or shafting is necessary, but a separate length of rod or shaft will be employed in between the stump ends of the units in the line, and it is joined up with the stump shaft ends through the separate socket couplings, fitting over the stump ends (which may be round, square or have flattened parts, and the coupling socket correspondingly formed, or provided with cotter or pin holes or keys), and on and over the ends of the length of rod or shaft; and one of such couplings at one end of the relatively long intervening length of shafting or rod will be adapted to serve as a longitudinal expansion joint as well as a coupling proper—or both may so serve. But where this is unnecessary, the couplings may be simple socket couplings fixed on the ends of the rod or shaft length, in which the stump ends of the two sets of gearing units fit, and are fixed by pins or keys or the like.

With regard to Figs. 3 to 7, these show in detail some sets of self-contained or fitted direction change unit mechanisms, comprising boxes, bevel wheels, and stump shafts, and if desired couplings on such shafts.

Fig. 3 shows motion transmitted through the sides or body of the box, in which case the axes of the motion transmission rods or shafts are parallel with the back of the box; while Fig. 4 shows the same box but with the one motion rod or shaft passed through the back of the box and the bulkhead to which it is secured, and the other through the upper part of the body of the box.

The bosses 18 of a box which are not used, can be covered or closed from the outside or inside by disks, plugs, or the like, and the box may be filled more or less with lubricant, so that the gear wheels and bearings are self-lubricating.

The front plate 17 of the box may be fastened to the open end of the body by screws screwing into a flange on this end of the box.

The ends of the stump shafts 20 which lie outside the box may be provided with holes, keyways, or both, or the like, to which the sleeve couplings 22 (see Figs. 6 and 7) may be fitted, and to which the ends of the lengths of motion transmission rods or shafts are connected or coupled in any known suitable way. At one end of a length of motion rod or shaft 2, the coupling will be fixed to the stump shaft 20 of a gear unit—say by through pins 23, keyways or the like—while at the other end, the coupling 22 will be connected or coupled to the stump shaft or axle of the gear unit at that end, by a longitudinal expansion form of coupling, as shown in Fig. 6; it being of the type that while this coupling 22 can slide on the stump shaft 20 at this end, it will revolve it or be revolved by it.

Fig. 7 shows on a smaller scale an outside view of a fitted self-contained gear unit with couplings, one of which is in the form of a universal joint, which is requisite in some parts of ships' telegraphic installations; the joint part 24 being between its two ends, and of any known suitable kind.

In Fig. 6, a vertical stump shaft or axle 20, carrying within the box a bevel wheel 3, extends through the casing on opposite points, and projects out of same below and above; and motion is transmitted from or to this stump shaft 20 to or through the other stump shaft 20 which passes through the back or bottom boss 18 and the bevel wheel 3 in the back or bottom of the box.

All the gear wheels of the gear units are fixed to their respective stump shafts or axles by pins, cotters, "feathers," or other suitable means.

In cases where the length of rod or shafting 2 is long, intermediate bearings will be provided at different points as intermediate supports; and when a shaft or rod passes through a bulk head a stuffing box and gland is fixed on the bulk head, and the rod or shaft passes through it and revolves in a water tight joint. Further, at any point where it is required and deemed advantageous, a universal joint coupling may be introduced in the rod or shaft, and in some cases an expansion coupling may be introduced in the line of rod or shafting.

What is claimed is:—

A gear unit comprising a casing having lugs at the back for securing the unit to a stationary part, a removable front cover plate for the casing, the casing having a plurality of inwardly extending bearing bosses, the axial lines of which meet at a common point, certain of the bosses having a common axial line, non-alined shafts to be passed through any two or more of the bosses, and gears having openings corresponding to the openings in the bosses, the gears having hubs adapted when in position to have a bearing contact with the ends of the bosses, said gears being adapted to be secured on the shafts within the casing and each being of a size to insure a driving mesh with any other gear so mounted.

In testimony whereof we have signed our names to this specification in the presence of two subscribing witnesses.

WILLIAM CHADBURN.
WILLIAM ROY CHADBURN.

Witnesses to the signature of WILLIAM CHADBURN:
  A. H. THOMPSON,
  WM. FANT.

Witnesses to the signature of WILLIAM ROY CHADBURN:
  CHARLES STRETTOR PETERSON.
  HARRY JOHNSTON.